United States Patent [19]

Mrvos et al.

[11] Patent Number: 5,562,762
[45] Date of Patent: Oct. 8, 1996

[54] JET INK WITH AMINE SURFACTANT

[75] Inventors: James M. Mrvos; Ann M. Piekunka, both of Lexington; Richard B. Watkins, Frankfort, all of Ky.

[73] Assignee: Lexmark International, Inc., Greenwich, Conn.

[21] Appl. No.: 442,596

[22] Filed: May 17, 1995

[51] Int. Cl.$^6$ ........................................ C09D 11/02
[52] U.S. Cl. ........................... 106/22 H; 106/22 R
[58] Field of Search ................... 106/22 H, 22 R

[56] References Cited

U.S. PATENT DOCUMENTS

| | | | |
|---|---|---|---|
| 4,308,061 | 12/1981 | Iwahashi et al. | 106/22 H |
| 4,508,570 | 4/1985 | Fujii et al. | 106/22 H |
| 5,062,892 | 11/1991 | Halko | 106/22 |
| 5,198,022 | 3/1993 | Aulick et al. | 106/22 K |
| 5,352,283 | 10/1994 | Beach et al. | 106/22 H |
| 5,356,464 | 10/1994 | Hickman et al. | 106/22 H |
| 5,370,731 | 12/1994 | Yamashita et al. | 106/22 H |
| 5,389,134 | 2/1995 | Breton et al. | 106/22 H |
| 5,409,529 | 4/1995 | Nagashima et al. | 106/22 H |
| 5,462,590 | 10/1995 | Yui et al. | 106/22 H |

FOREIGN PATENT DOCUMENTS

| | | | |
|---|---|---|---|
| 67576 | 4/1985 | Japan | 106/22 H |
| 190478 | 8/1985 | Japan | 106/22 H |
| 106684 | 5/1986 | Japan | 106/22 H |
| 10173 | 1/1987 | Japan | 106/22 H |
| 39675 | 2/1987 | Japan | 106/22 H |

OTHER PUBLICATIONS

English language translation of JP60/190478.
English language translation of JP60/67576.

*Primary Examiner*—Helene Klemanski
*Attorney, Agent, or Firm*—John A. Brady

[57] ABSTRACT

An aqueous jet ink of water, dissolved dyes and a surfactant of $R-N(C_2H_4O)_x(C_2H_4O)_yH$, where $x+y$ is from 5 to 25, with $x$ and $y$ each at least 2, and R is alkyl or oxygen containing. The static surface tension is less than 40 dynes/cm while the dynamic surface tension is about 65 dynes/cm. Satellites and splatter in thermal drop on demand printing are greatly reduced, and drop misdirection is reduced.

16 Claims, No Drawings

JET INK WITH AMINE SURFACTANT

TECHNICAL FIELD

This invention relates to aqueous liquid ink applied from nozzles, commonly termed jet inks. The inks of this invention exhibit cohesive ink placement during use.

BACKGROUND OF THE INVENTION

Jet inks commonly contain water, an organic co-solvent, such as tetraethyleneglycol, one or more dyes dissolved in the water, and a surfactant to facilitate penetration of the ink. The dyes are typically soluble in a basic solution and the ink contains a base such as ammonia, which leaves the ink after printing, leaving a printed dye resistant to ordinary water (termed waterfast printing). Other standard ingredients are a chelant for mineral control, such as tetrasodium ethylene diamine tetraacetic acid, a wetting agent such as glycerol, a biocide, and buffers, such as equal parts of sodium phosphate and sodium tetraborate. U.S. Pat. No. 5,352,283 to Beach et al has inks which incorporate much of such prior art. This invention also employs the same black dye as employed as the single dye in the embodiments of the foregoing patent 5,352,283. That dye is the direct subject of U.S. Pat. No. 5,198,002 to Aulick et al. U.S. Pat. No. 5,062,892 to Halko discloses buffers such as used in these formulations.

This invention employs an ethoxylated amine surfactant believed to be a novel incorporation in jet inks. The jet inks print conventionally with minimal splatter or separation into small adjoining dots (which will be termed satellites).

The novel surfactant is a tertiary dipolyethoxylated amine with the third substituent being a long chain organic moiety having no functional group or only ester and carboxylic acid functional groups. Trispolyoxylated amines in jet inks are disclosed in U.S. Pat. No. 5,389,134 to Breton et al. No comparable prior art with respect to the novel surfactant of this invention is known.

A prior art ink comparable in performance to the ink of this invention has a static surface tension of more than 45 dynes/cm and a dynamic surface tension of about 65 dynes/cm. The ink of this invention has a static surface tension of less than 40 dynes/cm and a dynamic surface tension also of about 65 dynes/cm.

DISCLOSURE OF THE INVENTION

The novel surfactant in aqueous jet inks of this invention is a tertiary amine having two polyethoxylated substituents and a third substituent of a straight chain alkyl, an ester, a fat or a fatty acid.

The jet ink of this invention prints with few separated small dots experienced during conventional drop on demand printing by thermal vaporization of the ink. Such outlying dots can be identified as either satellites or splatter. In accordance with this invention, both of these characteristics are greatly reduced in size and compared to such printing with inks of the same formulation except for employing different surfactants. In addition, horizontal line quality is improved. There is less drop misdirection and lines appear to be straighter and less fuzzy.

BEST MODE FOR CARRYING OUT THE INVENTION

The preferred in formula is as follows:

| INGREDIENT | FUNCTION | % BY WT. |
|---|---|---|
| Black Dye (See Note 1 Below) | Colorant | 2 |
| Yellow dye (Direct Yellow 132) | Colorant for Blackness Improvement | 0.25 |
| Tetrasoduim ethylenediamine tetraacetic acid (EDTA) | Chelating Agent for Calcium Control | 0.10 |
| Glycerol | Spread Control/ Humectant | 5 |
| Tetraethylene Glycol | Co-Solvent | 1.25 |
| Proxel GXL (trademark) | Biocide | 0.2 |
| t-amine (See Note 2 Below) | Surface Tension Adjustment | 0.05–0.1 (0.05 preferred) |
| $Na_2HPO_4 7H_2O$ | Buffer/Kogation Reduction | 0.25 |
| $NaB_4O_7 10H_2O$ | Buffer | 0.25 |
| Triethanolamine | Nozzle Start-up (Improve printing at start-up) | 1 |
| Ammonium hydroxide to adjust pH to 8.65 | | |
| Water | | Balance |

Note 1: This dye is the single dye used in the formulas disclosed in the foregoing patent 5,352,283 and is a direct subject for patenting of the foregoing patent 5,198,002.

Note 2: $R—N(C_2H_4O)_xH(C_2H_4O)_yH$, where $x + y$ (the number of polyoxyethylene groups) is from 5 to 25, with each $x$ and $y$ at least 2, and $R$ is a straight chain alkyl, an ester, a fat or a fatty acid. Specifically, functioning well in accordance with this invention are the following: the material where $R$ is tallow and $x + y$ is 5, which is sold commercially as Ethomeen (trademark) T15; the material where $R$ is stearyl and $x + y$ is 5, which is sold commercially as Chemeen 18-5; $x + y$ is 6, which is sold as Chemeen 18-6; and $x + y$ is 8, which is as Chemeen 18-8 and $x + y$ is 10, which is sold commercially as Chemeen 18-10.

Dynamic surface tension can be measured by bubbling nitrogen gas into the liquid ink at varying rates while observing the pressure on the gas to achieve those rates. Higher pressure at a given rate correlates with higher dynamic surface tension. Certain surfactants in formulas according to the foregoing preferred formula have been observed to increase notably in surface tension over increasing bubble rates (establishing high dynamic surface), whereas the same ink with 0.10% hexylcarbitol by weight as the only surfactant has relatively the same surface tension across all bubble rates (establishing low dynamic surface tension.)

At least one prior art ink having low satellites and splatter, as true for this ink, also has comparably high dynamic surface tension. The inventive ink has a static surface tension of 40 dynes/cm or less while that ink has a static surface tension of more than 45 dynes/cm. Both have dynamic surface tension of about 65 dynes/cm.

The foregoing preferred formula is optimized for use in the ExecJet (trademark) IIc printer sold commercially by the assignee of this invention which prints by drop on demand through nozzles by vaporizing the ink with heat, as is generally standard. Using the same ink as just described but replacing the amine surfactant with the hexylcarbitol and, separately, using the same ink but replacing the amine surfactant with Chemeen 18-2, which is like Chemeen 18-5 except x+y=2, both showed much higher satellites and splatter in normal use over that of the ink of this invention when printed by that ExceJet printer.

Variations within the foregoing description of this invention can be anticipated. Accordingly, reference is made to the following claims.

What is claimed is:

1. A liquid ink composition comprising at least one water soluble dye, water dissolving said dye, a volatile base bringing said ink to basic pH, and about 0.05 percent by weight of a surfactant, said surfactant being a tertiary amine having two polyethoxylate substitutents, with the number of ethoxy groups being in the range of 5 to 10 and each of said polyethoxylate substituents having at least two ethoxy groups, and a third substituent of stearyl.

2. The liquid ink as in claim 1 also comprising tetraethylene glycol as a co-solvent.

3. The liquid ink as in claim 2 also comprising glycerol as a humectant.

4. The liquid ink as in claim 3 also comprising triethanolamine to improve printing at start-up.

5. The liquid ink as in claim 4 in which said dye is about 2.3 percent by weight of said ink, said glycerol is about 5 percent by weight of said ink, said tetraethylene glycol is about 1.25 percent by weight of said ink, said base is ammonium hydroxide, said pH is about 8.7, and said ink also comprises about 0.5 percent by weight of buffers.

6. The ink as in claim 1 in which the number of said ethoxy groups is 5.

7. The ink as in claim 1 in which the number of said ethoxy groups is 6.

8. The ink as in claim 1 in which the number of said ethoxy groups is 8.

9. The ink as in claim 1 in which the number of said ethoxy groups is 10.

10. A liquid ink composition comprising at least one water soluble dye, water dissolving said dye, a volatile base bringing said ink to basic pH, and about 0.05 to 0.1 percent by weight of a surfactant, said surfactant being a tertiary amine having two polyethoxylate substitutents, with the number of ethoxy groups being in the range of 5 to 6 and each of said polyethoxylate substituents having at least two ethoxy groups, and a third substituent of stearyl.

11. The liquid ink as in claim 10 also comprising tetraethylene glycol as a co-solvent.

12. The liquid ink as in claim 11 also comprising glycerol as a humectant.

13. The liquid ink as in claim 12 also comprising triethanolamine to improve printing at start-up.

14. The liquid ink as in claim 13 in which said dye is about 2.3 percent by weight of said ink, said glycerol is about 5 percent by weight of said ink, said tetraethylene glycol is about 1.25 percent by weight of said ink, said pH is about 8.7, and said ink also comprises about 0.5 percent by weight of buffers.

15. The ink as in claim 10 in which the number of said ethoxy groups is 5.

16. The ink as in claim 10 in which the number of said ethoxy groups is 6.

* * * * *